United States Patent [19]

Lenhardt

[11] Patent Number: 4,660,271

[45] Date of Patent: Apr. 28, 1987

[54] PROCESS OF MANUFACTURING SPACER FRAMES FOR GLASS PANES AND METHOD OF REMOVING DESSICANT FROM A CORNER PORTION

[76] Inventor: Karl Lenhardt, Industriestrasse 2-4, 7531 Neuhausen-Hamberg, Fed. Rep. of Germany

[21] Appl. No.: 682,904

[22] Filed: Dec. 18, 1984

[30] Foreign Application Priority Data

Dec. 23, 1983 [DE] Fed. Rep. of Germany ....... 3346671

[51] Int. Cl.[4] ........................ B23P 17/00; B65G 53/46

[52] U.S. Cl. ................................ 29/527.4; 406/128; 406/137; 406/146; 29/517; 72/369

[58] Field of Search ...................... 29/530, 401, 401.1, 29/402.01-402.21, 527.4, 517; 72/458, 369, 367; 134/7, 8, 9, 22.1; 52/172; 156/273.9; 406/108, 122, 128, 137, 146

[56] References Cited

U.S. PATENT DOCUMENTS 3,810,302 5/1974 Broers .................................. 72/369

3,841,138 10/1974 Zinnbauer ............................ 72/369

3,964,289 6/1976 Williamson, Jr. ..................... 72/399

4,336,645 6/1982 Bucci ................................ 29/517 X

FOREIGN PATENT DOCUMENTS 29095 12/1964 Japan ...................................... 72/369

1481712 8/1977 United Kingdom .................. 72/369

*Primary Examiner*—Howard N. Goldberg

*Assistant Examiner*—Carl J. Arbes

*Attorney, Agent, or Firm*—Balogh, Osann, Kramer, Dvorak, Genova & Traub

[57] ABSTRACT

In a process of manufacturing a spacer frame for a perimeter-bonded insulating glass pane, a metal tubular bar is filled with a granular desiccant and is subsequently bent in each corner-forming portion about an axis which is at right angles to two parallel cheeks of the bar. The two cheeks are drilled through in each of said corner-forming portions to form two bores and a small quantity of the granular desiccant is removed from each of said corner-forming portions through at least one of said bores therein before said corner-forming portion is bent.

20 Claims, 3 Drawing Figures

PROCESS OF MANUFACTURING SPACER FRAMES FOR GLASS PANES AND METHOD OF REMOVING DESSICANT FROM A CORNER PORTION

BACKGROUND OF THE INVENTION

1. Field of the Invention

This invention relates to a process of manufacturing spacer frames for perimeter-bonded insulating glass panes wherein tubular metal bars filled with a desiccant are bent around an axis which is at right angles to two parallel cheeks of the tubular bar.

2. Description of the Prior Art

A perimeter-bonded insulating glass pane comprises two individual glass panes, which are spaced apart and bonded to an interposed spacer frame. The spacer frames usually consist of tubular metal bars, made in most cases of special steel or aluminum and filled with a desiccant in order to keep the residual moisture trapped in the insulating glass pane so low that a temperature drop will not result in a condensation of water on the inside surfaces of the insulating glass pane. When the spacer frames have been assembled and filled with the desiccant, they are coated on both cheeks with a long-lasting adhesive and sealing compound, which in most cases consists of polyisobutylene and which when the spacer frame has been placed between two individual glass panes will adhere to the latter so that the components of the insulating glass pane will be firmly held together.

The hollow spacer frame is filled in most cases with a granular desiccant which trickles easily. The desiccant usually consists of molecular sieve but may also consist of silica gel.

Most the spacer frames are made from straight tubular bars, which are first filled with the desiccant and are closed at their ends with a plug, e.g., of foamed rubber, and are then assembled to form a closed frame in that corner-forming angles are inserted into the ends of the bars. But the use of corner-forming angles involves several disadvantages: The assembling of the spacer frames must be performed in numerous steps. The joints of the corner-forming angles are often rather unstable and require a particularly careful application of the adhesive and sealing agent to the side faces of the spacer frame.

In the present description and the claims, the term cheeks is used to describe those parallel wall portions of the tubular bars or of the spacer frames comprising said bars which in the complete insulating glass pane are joined by an adhesive to the two individual glass panes.

It has also been proposed to manufacture the spacer frames from a single tubular bar, which is bent to form the corner portions so that each spacer frame has only a single joint, which can be closed by a connector. That joint may be disposed at a corner of the frame or between two adjacent corners.

It is not easy to bend tubular bars to a small-radius bend and such bending is even more difficult in the present case because the tubular bars are filled with a granular desiccant, which is almost incompressible. Whereas it has already been proposed to fill the spacer frames with the desiccant after the corner portions have been formed, that procedure is rather expensive because each of the four bars of the spacer frame must be opened, filled and then re-sealed.

When tubular bars filled with desiccant are to be bent, the problem will arise that the desiccant in the corner portions will be subjected to a progressively increasing pressure as the bending proceeds. Because the desiccant is incompressible, that application of pressure often causes the tubular bar to burst. In order to avoid such bursting, it has already been proposed (in German Patent Publication No. DE-28 29 444 A1) to bend the corner portions to the shape of a quadrant of a circle having a relatively large radius. Whereas that practice will preclude a bursting of the tubular bar in the corner portions of the spacer frame, it involves other disadvantages: The edge gap formed in the corner portions of the insulating glass panes will be much deeper than the edge gap at the straight portions of the spacer frame, and it is very difficult to fill said deep edge gaps with one of the sealing agents which are usually employed to seal perimeter-bonded insulating glass panes and have the consistency of a high-viscosity paste. Besides, the quadrant-shaped corner portions of the frame will be conspicuous if the insulating glass pane is installed into a rectangular sash having no rounded corners unless the rabbet of the sash is so deep that it covers also the quadrant-shaped corner portions of the spacer frame.

It has also been proposed to form the tubular bars in the inner walls of the corner-forming portions with slots by means of a milling cutter when the tubular bars have been filled with the desiccant and before they are bent. The position of the slot exactly defines the apex of the corner portion and slightly facilitates the bending operation but it does not prevent the bursting of the tubular bar on the outside if the radius of bend is small.

It has also been proposed to cut open the desiccant-filled tubular bar at the location of the apex of a subsequently formed corner portion and to remove a small quantity of desiccant from the tubular bar by an air blast directed to the opening. This procedure will reduce the risk of a bursting of the tubular bars during the bending operation.

But the two methods described last hereinbefore have the disadvantage that the configuration, width and location of the slots must be carefully selected in order to ensure that they will be automatically closed during the bending operation so that desiccant can no longer escape after the bending operation. That requirement cannot always be met. Besides, the slots formed in the corner portions of the spacer frames reduce the strength of the spacer frames, which inherently do not have a very high strength.

SUMMARY OF THE INVENTION

It is an object of the invention to provide a simple and inexpensive process of manufacturing spacer frames, which process permits desiccant-filled tubular spacer frames to be made from desiccant-filled tubular bars by bending the latter with a small bending radius and without a need to cut open the unbent tubular bars at a location which will be disposed on the inside of a corner portion of the frame so that the latter will not be weakened by such cut.

In a process of the kind described first hereinbefore that object is accomplished in that (a) a tubular bar is drilled to form bores in both cheeks of each corner-forming portion of said bar,
(b) a small quantity of desiccant previously filled into the tubular bar is removed from each corner-forming portion of the bar, and (c) the tubular bar is subsequently bent.

Further improvements proposed in accordance with the invention will be recited in the dependent claims.

In accordance with the invention the desiccant-filled tubular bar is not cut open throughout the width of the bar at a location which will be disposed on the inside of the spacer frame but is be drilled to form bores in a corner-forming portion in both cheeks of the bar. The bores permit a small quantity of desiccant previously filled into the tubular bar to be removed from the corner-forming portion of the bar. That quantity will depend on the extent to which the interior volume of the tubular bar will be reduced during the bending of a corner-forming portion. That reduction of the interior volume can easily be determined by experiments for different tubular bars.

When the required quantity of desiccant has been removed from the corner-forming portion, the tubular bar is bent to form a corner. The bores in the cheeks are automatically closed by the bending operation, which results in an upsetting of the cheeks. Whereas the bending results also in an elongation of the metallic bar wall on the outside of the corner portion, that elongation does not affect the cheeks, which usually do not extend as far as to the outside of the spacer frame but are connected to the outside wall of the spacer frame by oblique wall portions.

By the bending of the corner portions the bores formed in the cheeks are closed to such an extent that granular desiccant can no longer escape through the bores. Any residual opening will be completely closed when the cheeks of the spacer frame are subsequently coated with an adhesive and sealing compound. This is an important advantage afforded by the invention.

The spacer frame thus obtained is bent from a single tubular bar and is absolutely tight at all its bent corner portions and is intact on the inside and outside of the corner portions. Such frame will have an optimum stability.

The bores formed in the two cheeks of the tubular bar are preferably arranged with mirror symmetry with respect to that center plane of the tubular bar which is parallel to said cheeks and are most preferably disposed on the angle bisector of each corner. The desiccant can be most easily removed from the corner-forming portion through such bores when the latter are arranged in that manner and in that case the bores will promote the bending operation because the cheeks, which usually warp during the bending of tubular bars, will warp to a smaller extent than in the prior art as material has been removed from the cheeks to form the bores. But in the process in accordance with the invention it is also recommended to perform the bending operation while the cheeks of the tubular bar are gripped adjacent to the bend between a pair of gripping jaws or between a holding-down member and an abutment surface which is parallel to the holdling-down member so that a warping of the cheeks will be prevented in known manner. Warped cheeks will obviously be intolerable in a spacer frame installed in an insulating glass pane.

The cheeks of the tubular bar might be drilled with a drill which is engaged with one cheek from the outside and drills a hole through that cheek and then tranverses through the interior of the tubular bar until the drill reaches the other cheek. It is preferable, however, to drill holes through each cheek of the tubular bar from the outside. This is most suitably effected in that two mutually oppositely arranged drills are moved at the same time into engagement with and through both cheeks. That practice will afford the advantage that the burr formed on each cheek as a result of the drilling will be disposed on the inside and will not disturb the installation of the spacer frame in an insulating glass pane. Besides, two additional disadvantages will be avoided which will occur when a single drill traverses the interior of the tubular bar. Such single drill would have to be advanced over a relatively long distance and in some tubular bars might be deflected by an internal web of the bar.

Because desiccant is to be removed through the bores from the corner-forming portions, the diameter of the bores will depend on the particle size of the desiccant which is employed. Obviously the bore must be so large that the largest particle of the desiccant can pass through the bores in view of the particle sizes of the desiccant presently used in spacer frames it is preferable to provide bores having a diameter between 2 mm and 3 mm, preferably between 2.6 mm and 2.9 mm.

To remove the desiccant from the tubular bar having drilled side walls, one of the bores is suitably supplied with compressed air so that desiccant is blown out of the opposite bore. The blowing of compressed air into one of the bores is suitably accompanied by intermittent air blasts directed into the other bore so that a particle of the desiccant which has become stuck in the bore through which the desiccant is to be blown out can be detached from such bore and that bore can be blocked only for a very short time. In order to increase the effect of such intermittent air blasts, they are preferably directed to the bore in different directions. The removal of the desiccant will be further facilitated if compressed air is supplied to the two bores in alternation. It will be particularly recommendable to reverse the direction of the air blast in intervals of 0.1 second to 0.2 second.

The desiccant can be blown out of the tubular bar through the bores from either side of the bar. It will be recommendable, however, to blow the desiccant out of the bar through the bores only on one side. In that case the quantity of the desiccant which is removed can be controlled in a particularly simple manner, as will be described in the detailed description of the preferred embodiment. An escape of desiccant from one of the bores can be prevented in a simple manner in that a blast nozzle having a sufficiently small discharge opening is directly engaged with the tubular bar around said one bore. That practice will afford the further advantage that compressed air from that one blast nozzle can directly enter the tubular bar. The nozzle or nozzles disposed on the other side of the tubular bar may be spaced from the bore disposed on that side because the intermittent air blasts from that nozzle or those nozzles are not required to penetrate the tubular bar to a large depth but only to detach stuck particles of the desiccant.

To ensure a bending to a defined shape and at an exactly defined location, that wall of the tubular bar which will be disposed on the inside of the bar after the bending operation it is desirable before the bending operation to form that wall of the tubular bar which will be disposed on the inside of the bar after the bending operation with a slight inward depression along the line where the apex will be disposed after the bending operation whereas that wall will not be cut open as that depression is formed.

The tubular bar is preferably held in a horizontal orientation with vertical cheeks at least during the removal of the desiccant from the corner-forming portions and at the beginning of the bending operation, which is performed about a horizontal axis. In that case desiccant can be expected to trickle only in a small quantity, at most, into the free space formed in the interior of the tubular bar so that there will a free space extending substantially throughout the interior width of the tubular bar during the bending operation. It will be particularly recommendable to hold the tubular bar in such an orientation that that surface which is disposed on the inside after the bending operation will face upwardly at least during the removal of the desiccant. Any desiccant which trickles into the region between the bores will then be kept at least from that portion of that region in which the tubular bar will be most strongly constricted during the bending operation.

The extent to which the tubular bar will be upset on its inside and elongated on its outside during the bending operation can be influenced to some extent by the selection of the position of the axis of the bending operation. The axis of the bending operation is preferably arranged to extend through the two cheeks and to intersect the angle bisector of the corner. Alternatively, that axis might be disposed on the outside of the tubular bar.

To permit a removal of an exactly defined quantity of the desiccant by the air blasts, the desiccant is suitably blown into a receiver which is mounted on one side wall of the tubular bar. That receiver preferably consists of a cylinder, which is open at its head end and in which a piston is slidably disposed. The cylinder head is engaged with one cheek of the tubular bar around the bore therein and the piston is moved to a position which is so selected in dependence on the tubular bar to be bent that the chamber volume between the face of the piston and that cheek of the tubular bar with which the cylinder head is engaged exactly corresponds to the quantity of desiccant which is to be removed. A blast nozzle is engaged with the tubular bar around the opposite bore and is used to blow dessicant in the quantity which is to be removed into the cylinder on the opposite side. To permit an adaptation to tubular bars differing in width, the distance between the blast nozzle and the cylinder can be altered. When desiccant in the predetermined quantity has been blown out of the tubular bar, the cylinder is removed from the tubular bar and the desiccant collected in the cylinder is ejected from the open end of the cylinder or, when the piston has been retracted behind a laterally disposed outlet opening formed in the rear portion of the cylinder, the desiccant is sucked through that lateral outlet opening.

The piston defines such a clearance with the cylinder that compressed air can flow past the piston and escape from the cylinder but desiccant collected in the cylinder cannot escape from the latter until the piston has been retracted so as to expose the lateral outlet opening.

The open head of the cylinder is preferably provided with at least one air blast nozzle and preferably with two mutually opposite air blast nozzles, which nozzle or nozzles opens or open into the opening formed in the cylinder head and extend outwardly from the opening of the cylinder head at an acute angle. Such nozzles can be used to deliver intermittent blasts of compressed air, preferably in alternation, into that bore of the tubular bar with which the cylinder communicates. Said intermittent air blasts may be used to detach any particles of the desiccant which have become stuck in the bore of the tubular bar.

DETAILED DESCRIPTION OF THE PREFERRED EMBODIMENT

A preferred embodiment of the invention will now be explained more in detail with reference to the accompanying diagrammatic drawing.

Figure 1:
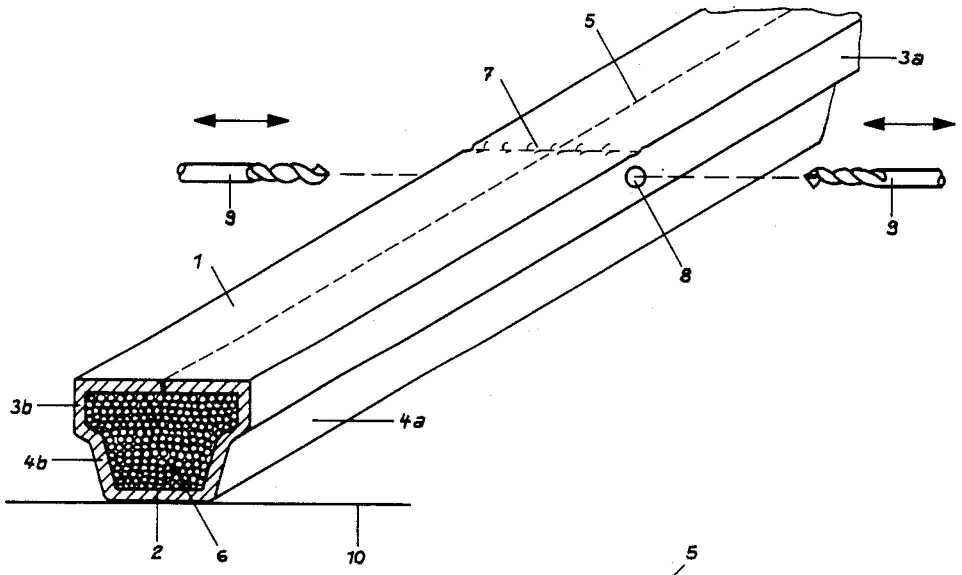
FIG. 1 is a perspective view showing a tubular bar which has been filled with desiccant but has not yet been bent.

FIG. 1 shows a metallic tubular bar consisting of a base wall 1, a face wall 2, which is narrower than the base wall 1 and parallel thereto, and two side walls, which interconnect the base and face walls 1 and 2. Each of said side walls consists of a cheek 3*a* or 3*b*, which extends from the base wall 1 at right angles thereto, so that the cheeks 3*a* and 3*b* are parallel to each other, and an oblique wall 4*a* or 4*b*, which extends from the cheek 3*a* or 3*b* to the face wall 2. The base wall 1 is disposed on the inside of the tubular bar when the same has been bent to form a spacer frame and is formed with perforations 5, through which granular desiccant 6 filled into the tubular bar can receive moisture from the outside of the tubular bar so that said moisture can be absorbed by the desiccant.

Such tubular bar filled with the desiccant 6 is to be bent so that the bar forms a rectangular spacer frame. To permit such bending, transverse bores are drilled through the two cheeks 3*a* and 3*b* of the tubular bar in each corner-forming portion of the bar. The bores of each pair lie in a plane which is at right angles to the longitudinal axis of the tubular bar and contains the line 7 at which the apex of the corner will be disposed. The bores in the cheeks 3*a* and 3*b*, respectively, are preferably drilled at the same time by twist drills 9, which are engaged with the cheeks 3*a* and 3*b* from the outside so that the burrs formed by the drilling operation will be disposed on the inside and will not be disturbing.

When the bores 8 in the cheeks 3*a* and 3*b* have been drilled, a quantity of desiccant 6 is removed from each corner-forming portion through the bores 8. For this operation the tubular bar is preferably disposed in a horizontal orientation with the narrow face wall 2 lying on a horizontal surface of a support 10. This practice will afford the advantage that only a small quantity of desiccant 6 can trickle into the corner-forming portion from the ends thereof and a free space will be preserved in the tubular bar below the base wall 1 between the bores 8, where the tubular bar will be most strongly constricted during the bending operation.

Figure 2:
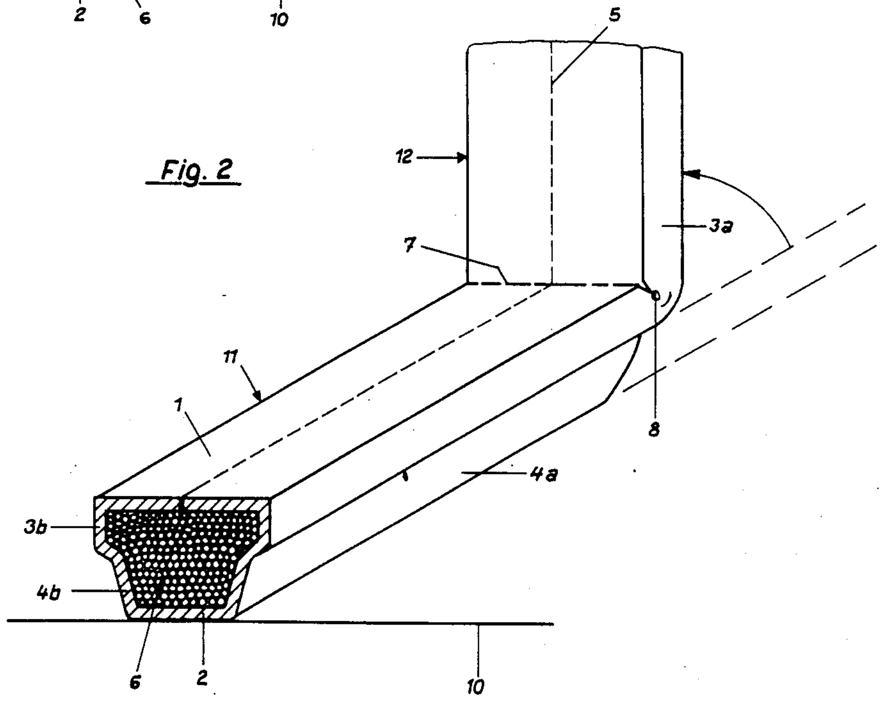
FIG. 2 is a perspective view showing the same tubular bar having a bent corner portion and FIG. 3 is a horizontal sectional view showing the tubular bar of FIG. 1 with a device which has been mounted on both cheeks of the bar and serves to remove desiccant through the bores formed in the cheeks.

When desiccant 6 in the intended quantity has been removed, the base wall 1 of the tubular bar is slightly depressed at right angles to its longitudinal direction along the line 7 which will be at the apex of the corner after the tubular bar has been bent (FIG. 2). The base wall may be depressed along the line 7 by means of a wedge-shaped tool. In that operation the base wall 1 must only be depressed but must not be cut through. The tubular bar is subsequently bent through 90°, preferably from the position shown in FIG. 1, so that one leg 11 still lies on the horizontal supporting surface 10 after the bending operation whereas the other leg 12 then extends vertically upwardly.

The bending operation may be performed in a manner known per se. Bending apparatus which is suitable for this purpose has been described in No. EP-0 009 703-B1 and in the German Patent Publications Nos. DE 32 31 698-A1, and DE-32 23 881-A1. During the bending operation the cheeks 3*a* and 3*b* are preferably gripped adjacent to the bores 8 by two gripping jaws having planar gripping surfaces so that an otherwise possible warping of the cheeks during the bending operation will be prevented.

The two bores 8 are virtually completely closed by the bending operation so that desiccant can no longer escape through the bores during the subsequent handling of the bent tubular bar or the complete spacer frame.

The bores 8 are finally absolutely tightly sealed in that cheeks 3*a* and 3*b* are subsequently coated with an adhesive and sealing compound consisting usually of polyisobutylene and required in the manufacture of the insulating glass panes to firmly secure two individual glass panes to the interposed spacer frame.

It is apparent that the spacer frame manufactured by the process in accordance with the invention is perfectly tight in its corner portions and is not cut open along its inner apex line 7 so that the frame has a high mechanical strength and will prevent an escape of desiccant into the interior of the insulating glass pane. Besides, the spacer frame will have no cracks on the outside of its corner portions because desiccant has been removed from the corner portions so that an excessive expansion of the walls of the tubular bar need not be feared.

Figure 3:
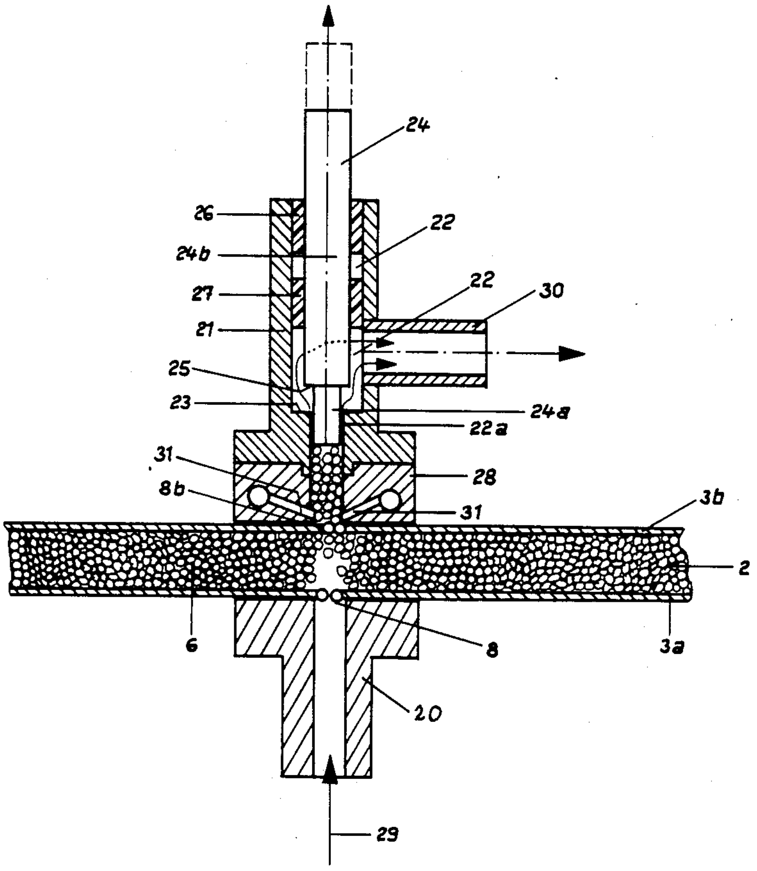

Apparatus of the kind shown in FIG. 3 is desirably used to remove desiccant from the tubular bar adjacent to the bores 8. That apparatus comprises a blast nozzle 20, which is engaged with one cheek 3*a* of the tubular bar around the bore formed in the flange, and a cylinder 21 having an open cylinder head 28, which is engaged with the opposite cheek 3*b* of the tubular bar around the bore 8*b* in the cheek 3*b*. The cylinder 21 has a stepped bore 22, which communicates with the bore in the cylinder head 28 and which adjacent to its open end is smaller in diameter than in the rear portion of the cylinder. The forward and rear portions 22*a*, 22*b* of the cylinder bore 22 are connected by a shoulder 23, which constitutes a stop that is engageable by a stepped piston 24. The forward portion 24*a* of the piston 24 is smaller in diameter than its rear portion 24*b*. The forward and rear portions 24*a*, 24*b* of the piston 24 are connected by a shoulder 25, which is engageable with the shoulder 23 of the cylinder 21. The rear portion 24*b* of the piston 24 is guided in seals 26 and 27 mounted in the rear portion of the cylinder. The forward portion 24*a* of the piston is movable into the narrower portion 22*a* of the cylinder bore 22 to a depth which determines the volume of the cavity defined in the cylinder head 28 between the piston 24 and the cheek 3b of the tubular bar. The air blast discharged by the blast nozzle 20 causes desiccant 6 in a predetermined quantity to be blown from the tubular bar into that cavity. The compressed air flowing in the direction of the arrow 29 through the blast nozzle 20 enters the tubular bar through the bore 8 and leaves the tubular bar through the opposite bore 8*b* and entrains part of the granular desiccant through the bore 8*b* into the cylinder head 28. The clearance between the forward portion 24*a* of the piston and the narrower forward portion 22*a* of the cylinder bore is so large that the air can flow past the piston 24 and can leave the cylinder through an outlet pipe 30 communicating with the rear portion of the cylinder. On the other hand the clearance defined by the forward section 24*a* of the piston and the forward portion 22*a* of the cylinder bore is so small that granular desiccant 6 cannot move past the piston to the outlet pipe 30 as long as the forward portion 24*a* of the piston extends in the forward portion 22*a* of the cylinder bore. Only when desiccant has been removed from the tubular bar in the quantity which is determined by the position of the piston is the cylinder 21 with its cylinder head 28 displaced to some extent, e.g., in a downward direction at right angles to the plane of the drawing in FIG. 3 so that the bore in the cylinder head 28 no longer communicates with the bore 8*b*, and the piston 24 is then retracted to a rear end position indicated by dotted lines in FIG. 3, and the desiccant contained in the cylinder head is sucked through the outlet pipe 30.

The cylinder head 28 is formed with two air blast nozzles 31, which are diametrically opposite to each other and directed into the bore formed in the cylinder head 28. As desiccant 6 is blown out of the tubular bar, the nozzles 31 are used to direct intermittent air blasts in alternation into the bore 8*b* so that individual desiccant particles which have become stuck in the bore 8*b* will be detached.

What is claimed is:

1. In a process of manufacturing a spacer frame for a perimeter-bonded insulating glass pane, which process comprises:

filling with a granular desiccant a tubular metal bar comprising a plurality of corner-forming length portions and having two parallel cheeks on opposite sides, forming an opening in said tubular bar in each of said corner-forming portions, removing granular desiccant from each of said corner-forming portions through said opening therein, and bending each of said corner-forming portions about an axis which is at right angles to said cheeks to form a corner portion of said spacer frame, the improvement comprising drilling each of said corner-forming portions through said two cheeks at a location where the corner is to be formed to provide them with two opposite bores of which at least one is sufficiently large to permit said granular desiccant to escape from said corner-forming portions, and removing a small quantity of desiccant previously filled into said tubular bar from each corner-forming portion through said at least one bore therein before said corner-forming portion is bent about said axis.

2. A process as defined in claim 1, comprising the step of drilling said two bores into said two cheeks of each of said corner-forming portions in mirror symmetry with respect to a center plane of said corner-forming portion, which center plane is parallel to said cheeks.

3. A process as defined in claim 1, comprising the step of drilling said two bores into said cheeks in each of said corner-forming portions from the outside.

4. A process as defined in claim 1, wherein said bores are 2 mm to 3 mm in diameter.

5. A process as defined in claim 4, wherein said bores are 2.6 mm to 2.9 mm in diameter.

6. A process as defined in claim 1, comprising the step of blowing compressed air into one of said bores in said corner-forming portion in order to remove granular desiccant from each of said corner-forming portions through the opposite bore therein.

7. A process as defined in claim 6, comprising the step of intermittently blowing additional compressed air into the opposite bore.

8. A process as defined in claim 7, comprising the step of blowing said additional compressed air alternately from different directions into said opposite bore.

9. A process as defined in claim 7, comprising the step of blowing said additional compressed air into said two bores in alternation.

10. A process as defined in claim 1, comprising the step of selecting said tubular bar to have a wall which in each of said corner-forming portions lies on the inside of said corner portion when said corner-forming portion has been bent, and forming a depression in said wall in each of said corner-forming portions before the bending thereof in such a manner that the formation of an opening through said wall is avoided, said depression extending along a line which is disposed at the apex of said corner portion when said corner-forming portion has been bent.

11. A process as defined in claim 1, comprising the step of removing said granular desiccant from each of said corner-forming portions through said at least one bore therein when said corner-forming portion has an orientation in which it extends horizontally and its cheeks extend in vertical planes, and arranging each of said corner-forming portions in said orientation at the beginning of its bending about said axis.

12. A process as defined in claim 11, comprising the step of selecting said tubular bar to have a wall which in each of said corner-forming portions lies on the inside of said corner portion when said corner-forming portion has been bent, and removing said granular desiccant from each of said corner-forming portions through said at least one bore therein when said corner-forming portion has an orientation in which said wall is at the top of said corner-forming portion.

13. A process as defined in claim 1, comprising the step of bending each of said corner-forming portions about an axis which extends through said two cheeks and intersects the angle bisector of the resulting corner portion.

14. A process as defined in claim 1, comprising the step of coating both said cheeks on the outside with an adhesive and sealing compound after all said corner-forming portions have been bent to form respective corner portions, so that said cheeks are entirely sealed by said adhesive and sealing compound at the locations of all said bores.

15. In a process of manufacturing a spacer frame for a perimeter-bonded insulating glass pane, which process comprises:

filling with a granular desiccant a tubular metal bar comprising a plurality of corner-forming length portions and having two parallel cheeks on opposite sides, forming an opening in said tubular bar in each of said corner-forming portions, removing granular desiccant from each of said corner-forming portions through said opening therein, and bending each of said corner-forming portions about an axis which is at right angles to said cheeks to form a corner portion of said spacer frame, the improvement comprising driling each of said corner-forming portions through said two cheeks to form them with two opposite bores, at least one of said bores being sufficiently large to permit said granular desiccant to escape from said corner-forming portion through said one bore, blowing compressed air from an air blast nozzle into one of said bores in said corner-forming portion before said corner-forming portion is bent about said axis in order to remove granular desiccant in a controlled quantity from each of said corner-forming portions through the opposite bore therein, and receiving said granular desiccant removed from said opposite bore in a cylinder having an open end facing said opposite bore and containing a slidably mounted piston.

16. Apparatus for removing granular desiccant from a corner-forming portion of a metal tubular bar for use with means for receiving and bending said metal tubular bar, said tubular bar having two parallel cheeks, which are disposed on opposite sides of said corner-forming portion and formed with two opposite bores, one of which is sufficiently large to permit said granular desiccant to escape from said corner-forming portion through said bore, said apparatus comprising an air blast nozzle operatively associated with said two parallel cheeks for blowing compressed air into one of said bores, a cylinder having an open end and containing a slidably mounted piston and being adapted to be so arranged that its open end faces the opposite bore, and mounting means which are operatively associated with one of said two opposite bores and are carrying said air blast nozzle and said cylinder at a variable distance from each other.

17. Apparatus as set forth in claim 16, wherein said cylinder comprises at said open end a cylinder head formed with at least one additional air blast nozzle for discharging air through said open end of said cylinder.

18. Apparatus as set forth in claim 17, wherein said cylinder in its rear portion is provided with a lateral outlet opening permitting compressed air to escape from the cylinder which entered the cylinder at its open end.

19. Apparatus set forth in claim 18, wherein the piston in said cylinder defines with said cylinder an annular clearance space which in a first position of the piston is sufficiently small to prevent an escape of said granular desiccant through said space, the lateral outlet opening in said cylinder communicates with said open end of said cylinder only through said annular clearance space in any position of said piston, and said piston is retractable from said first position to a second position in which said outlet opening is exposed to said open end of said cylinder so that the granular desiccant contained in the cylinder may be withdrawn through said lateral outlet opening.

20. Apparatus set forth in claim 19, which comprises a suction means connected to said outlet opening.

* * * * *